UNITED STATES PATENT OFFICE.

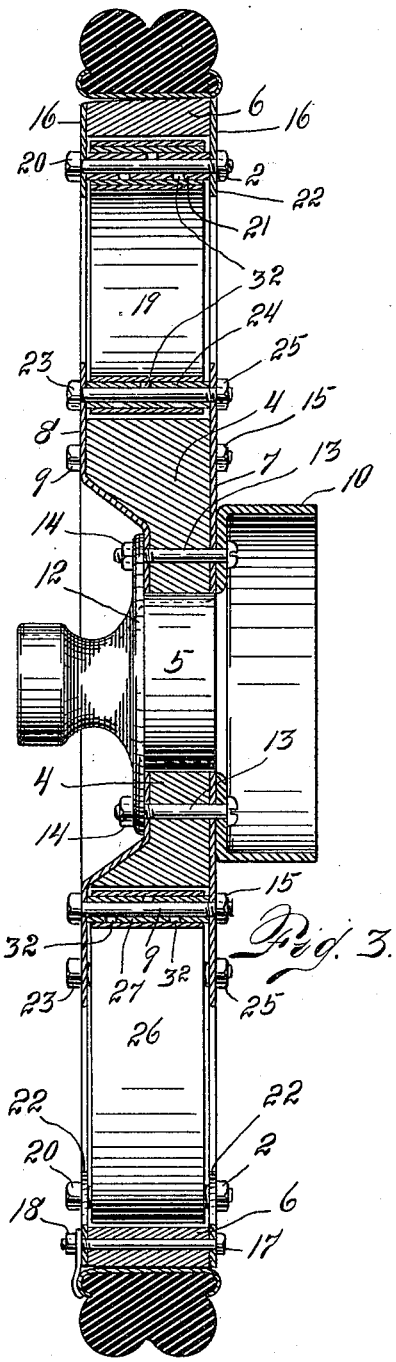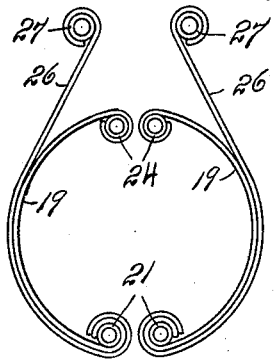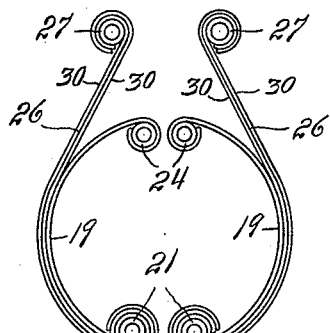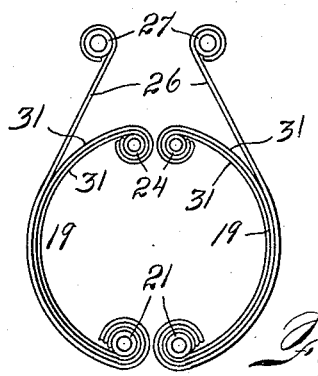

GEORGE W. BOWMAN, OF PALISADES, COLORADO, ASSIGNOR TO THE UNIVERSAL SPRING WHEEL AND MANUFACTURING COMPANY, OF PALISADES, COLORADO, A CORPORATION OF COLORADO.

SPRING-WHEEL.

1,309,839.  Specification of Letters Patent.  Patented July 15, 1919.

Application filed January 23, 1917, Serial No. 143,916. Renewed May 24, 1919. Serial No. 299,560.

*To all whom it may concern:*

Be it known that I, GEORGE W. BOWMAN, citizen of the United States, residing at Palisades, county of Mesa, and State of Colorado, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels of the general construction disclosed in an application of Cicero G. Smith, Serial No. 66,713, filed December 14th, 1915.

My improvements relate to certain features of construction whereby the approximately semi-circular springs interposed between the hub and felly have their inner and outer extremities connected with distinct bolts or pins. That is to say, the inner extremity of each semi-circular spring as well as the outer extremity of the same spring, is connected with a distinct bolt or pin as distinguished from having the adjacent extremities of the two semi-circular spring members connected with the same bolt or pin as in the aforesaid application. Again, the spoke springs which coöperate with the semi-circular springs, have the adjacent inner extremities of any two springs, connected with separate bolts or pins as distinguished from the construction of the said application in which the corresponding extremities of the said spoke spring members are both connected with a single bolt or pin.

By virtue of my improved construction, much stronger and more efficient spring members are formed. Furthermore, in my improvement I preferably employ two or more laminations or plates in the formation of each so-called spoke spring member and this may also be true of each semi-circular spring member. By using a separate bolt construction as heretofore outlined, I avoid the necessity of reducing the eyes of the adjacent extremities of the spring members in order to cause them to interlock on the hinge bolts or pins. It has been found by experience, that the reduction of the metal of the extremities of the spring members, weakens these members and causes them to break, whereas where my improved construction is employed the life of the springs is greatly prolonged. Furthermore, by forming the spring members, particularly the spoke spring members, of a number of layers or laminations, the efficiency of the springs, from a standpoint of resilience is considerably increased. In my improvement the bolts or pins with which the extremities of the spring members are connected are surrounded by tubes or bushings with which the extremities of the spring members come directly in contact.

Having briefly outlined my improvement, I will proceed to describe the same in detail, reference being made to the accompanying drawing in which is illustrated an embodiment thereof.

In this drawing:

Fig. 3 is a section taken on the line 3—3, Fig. 1, looking toward the right, the parts being shown on a considerably larger scale.

Fig. 4 is a detail view of a single spring unit, including a pair of semi-circular springs and a pair of spoke springs arranged in coöperative relation.

Fig. 5 is a similar view showing a modified form of construction.

Fig. 6 is a view illustrating still another modification.

The same reference characters indicate the same parts in all the views.

Figure 1:
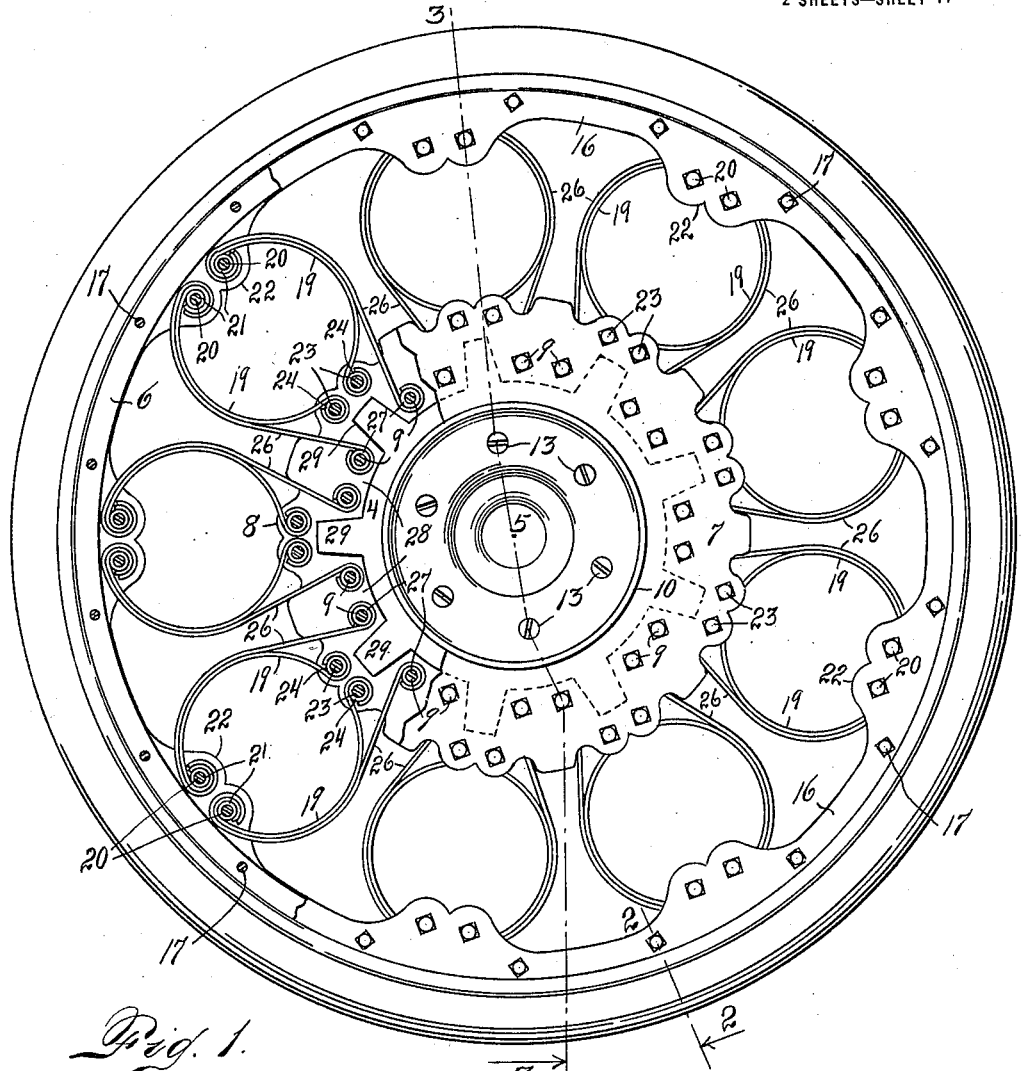
Figure 1 is an elevation partly in section, of a spring wheel equipped with my improvements.
Figure 2:
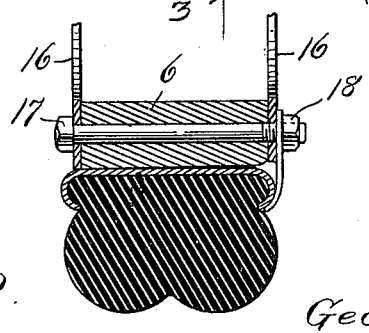
Fig. 2 is a section taken on the line 2—2, Fig. 1, with the parts shown on a larger scale.

Let the numeral 5 designate the hub and 6 the felly of a wheel. To the opposite sides of the hub are applied plates 7 and 8 which are secured to the inner, preferably wooden or fiber, member 4 by means of bolts 9. Furthermore, a brake band drum 10 and a collar 12, are also secured to the hub member 4 and to the plates 7 and 8, by bolts 13 to which fastening nuts 14 are applied. The bolts 9 are held in place by nuts 15. Applied to the opposite sides of the felly 6 are plates 16 which are secured to the felly by means of bolts 17 to which are applied fastening nuts 18.

Between the hub and felly are located a series of approximately circular springs 110 each composed of two spring members 19. The outer extremities of these spring members are composed of eyes which respectively encircle bolts 20, the latter being in turn surrounded by sleeves or bushings 21 with which the eye extremities of the spring members come directly in contact. These bolts 20 are also passed through openings formed in inwardly projecting parts 22 of the felly plates 16. In this manner the outer extremities of these springs are held in coöperative relation with the felly of the wheel. To the extremities of the bolts 20, are applied fastening nuts 22.

The inner extremities of the spring members 19 also respectively secured to bolts 23 which are also surrounded by sleeves or bushings 24 with which the eye extremities of the spring members 19 come directly in contact. The bolts 23 are passed through registering openings formed in the plates 7 and 8, the said bolts being held securely in place by fastening nuts 25. It will be noted that the two bolts 20 of each spring unit are arranged in suitable proximity to each other. This is also true of the two bolts 23 of each approximately circular spring, thus maintaining all the advantages of the circular spring construction, while at the same time the adjacent extremities of the two spring members 19 are connected with separate and distinct bolts or pins. In addition to the circular springs, I employ two spoke springs 26 which coöperate with each circular spring. The outer extremities of the springs 26 are formed into eyes and engage the corresponding extremities of the respective spring members 19 while the inner extremities of the two springs 26 are formed into eyes and directly engage bushings 27 mounted on the bolts 9. Attention is called to the fact that the bolts 9 do not pass through the wooden member 4 of the hub since the latter is provided with recesses 28 which are large enough to receive the inner portions of two adjacent spoke springs 26 whereby the said springs are given freedom of action in order to properly perform their function. The formation of the notches or recesses 28 results in providing a number of projections 29 on the hub member 4, these projections being spaced by the recesses 28.

Attention is called to the fact that each spoke spring 26 may be composed of two members or laminations 30 which are in direct contact with each other and are formed into eyes whereby the eye at the inner extremity of each outer lamination 30 is in direct contact with the bushing 27, while the eye on the outer extremity of the same lamination is arranged outside of the corresponding eye of the inner lamination 30 while the eye on the inner extremity of the last named lamination is necessarily arranged outside of and in contact with the adjacent eye of the outer lamination. This results from the fact that in forming the eyes on the two extremities of the laminated spring, the said extremities are turned in opposite directions. Hence, in the use of these springs 26, the laminations 30 have no movement upon each other.

In the form of construction shown in Fig. 6, each of the semi-circular spring members 19 is composed of two laminations 31, the eyes of the two laminations of each semi-circular spring member being arranged in coöperative relation, that is to say, the eyes of the outer lamination being arranged outside of the corresponding eyes of the inner lamination.

From the foregoing description the use and operation of my improvement will be readily understood and need not be described further in detail.

Attention is called to the fact that the sleeves or bushings 21, 24 and 27 employed in connection with the semi-circular and spoke springs as heretofore described, are slightly longer than the width of the springs whereby their extremities engage the hub plates 7 and 8 and the felly plates 16, whereby these plates are prevented from interfering with the proper action of the hinged extremities of the springs. In other words, these sleeves or bushings form spacing members between the hub plates and between the rim plates to prevent these plates from binding engagement with the spring extremities. Furthermore, these sleeves are perforated between their extremities as shown at 32 (see Fig. 3) whereby they will hold or retain a quantity of lubricant which will be supplied to the eye extremities of the springs as it may be needed.

Having described my invention what I claim is:

1. A wheel comprising a hub, a rim, circular springs located between the hub and rim each spring comprising two approximately semi-circular spring members, hinge pins arranged on the hub adjacent each other and with which the inner extremities of the said spring members are respectively connected, other hinge pins mounted adjacent each other on the rim and with which the outer extremities of the said spring members are respectively connected, each extremity of each of said spring members being connected to a hinge pin independently of the other member, spoke springs also located between the hub and rim, the outer extremities of the spoke springs being mounted on the same pins with which the corresponding extremities of the semi-circular spring members are connected, and other hinge pins mounted on the hub and with which the inner extremities of the said spoke springs are respectively connected, the inner extremity of each spoke spring being connected to a hinge pin independently of every other spring member.

2. A wheel comprising a hub having oppositely disposed side plates, a rim having oppositely disposed side plates, circular springs located between the hub and rim, each spring comprising two approximately semi-circular spring members, hinge pins passing through the plates of the hub and with which the inner extremities of the said spring members are connected, other hinge pins mounted on the rim and passing through the plates of the rim and with which the outer extremities of the said spring members are connected, each extremity of each of said spring members being connected to a hinge pin independently of the other member, spoke springs also located between the hub and rim, the outer extremity of each spoke spring being connected with the outer extremity of one of said semi-circular spring members, other hinge pins mounted on the hub and passing through the plates thereof and with which the inner extremities of the spoke springs are connected, the inner extremity of each spoke spring being connected to a hinge pin independently of every other spring member, all of the hinge pins being equipped with bushings, those with which the inner extremities of the several springs are connected being of sufficient length to space the hub plates from the springs, while those with which the outer extremities of the springs are connected are of sufficient length to space the rim plates from binding engagement with the springs.

In testimony whereof I affix my signature, in presence of two witnesses.

GEORGE W. BOWMAN.

Witnesses:
　GERTRUDE I. POTTER,
　HORACE J. POMEROY.

Copies of this patent may be obtained for five cents each, by addressing the "Commissioner of Patents, Washington, D. C."